United States Patent
Doumet

[19]

[11] Patent Number: 6,012,918

[45] Date of Patent: Jan. 11, 2000

[54] METHOD AND APPARATUS FOR PRODUCING CEMENT CLINKER

[76] Inventor: Joseph E. Doumet, 1, Rue Jacob FR-75006, Paris, France

[21] Appl. No.: 09/058,628

[22] Filed: Apr. 10, 1998

[30] Foreign Application Priority Data

Jun. 2, 1997 [DE] Germany ............... 971 08 811

[51] Int. Cl.[7] .................................. F27B 7/02
[52] U.S. Cl. ............................. 432/106; 432/105
[58] Field of Search ................... 432/105, 106, 432/58, 15

[56] References Cited

U.S. PATENT DOCUMENTS

| | | | |
|---|---|---|---|
| 3,920,380 | 11/1975 | Heian | 432/106 |
| 4,295,823 | 10/1981 | Ogawa et al. | 432/106 |
| 4,392,822 | 7/1983 | Brachthauser et al. | 432/105 |
| 4,616,575 | 10/1986 | Schulte | 432/58 |
| 5,325,606 | 7/1994 | Liborius | 432/58 |

*Primary Examiner*—John A. Jeffrey
*Assistant Examiner*—Jiping Lu
*Attorney, Agent, or Firm*—Reising, Ethington Barnes, Kisselle, Learman & McCulloch, P.C.

[57] ABSTRACT

Cement clinker is produced from powdered and fine-grained raw material by the use of a vertical stage cyclone preheater, a precalcinator, a kiln, and a cooler. The raw material is preheated by exhaust gases from the kiln and the cooler. Dust is filtered out of the exhaust gases, preheated, precalcined, and then burnt to cement clinker in a kiln. Downstream of the first preheater stage a relatively smaller part-quantity of the material is branched off and fed as a mixture jointly with the dust from the filter to the upper end of the precalcinator. This mixture passes through the precalcinator from top to bottom co-current with combustion air and with fuel for precalcination and then is delivered to the kiln inlet.

21 Claims, 1 Drawing Sheet

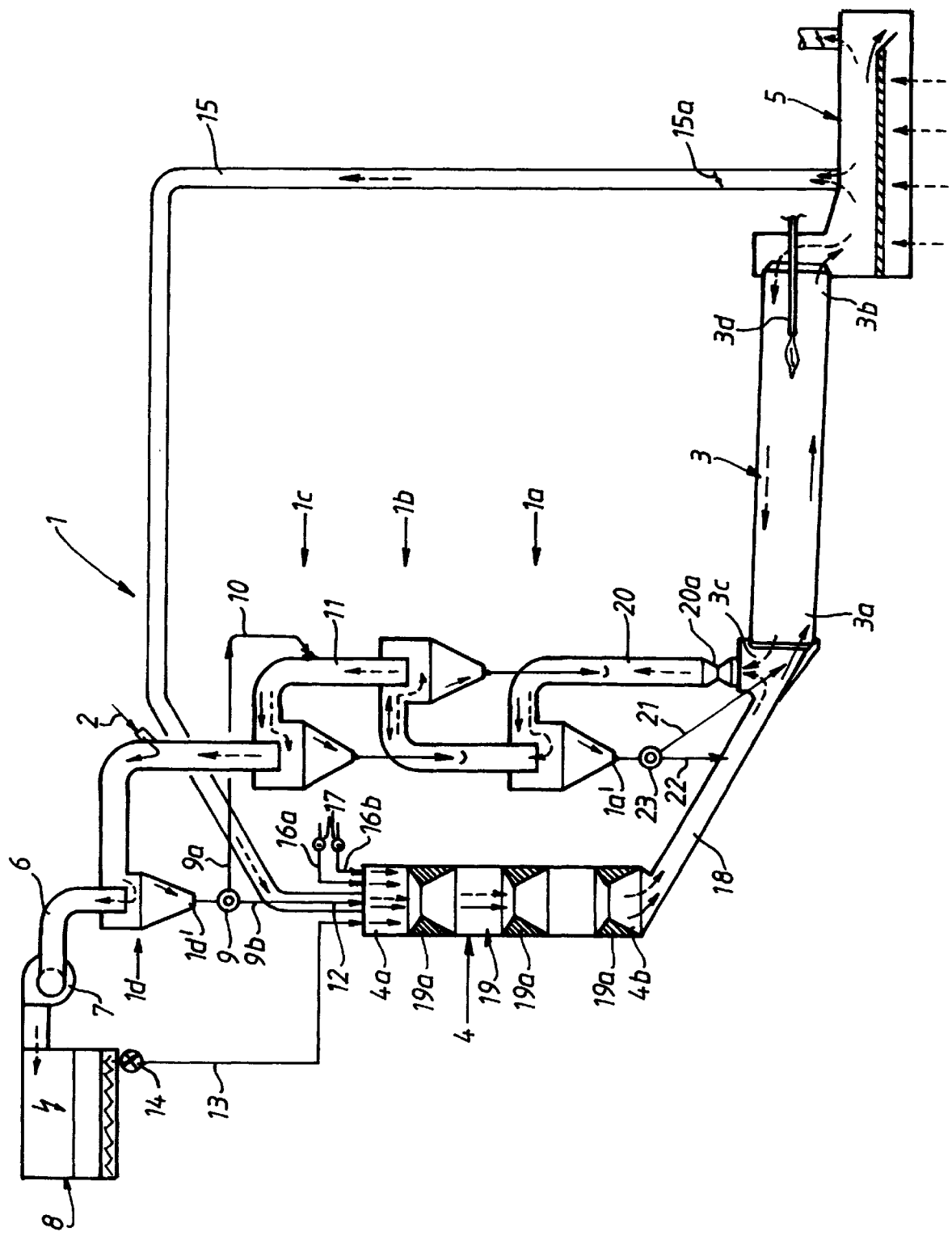

METHOD AND APPARATUS FOR PRODUCING CEMENT CLINKER

The invention relates to a method and apparatus for producing cement clinker from powdered and fine-grained raw material.

BACKGROUND OF THE INVENTION

Various embodiments of methods and apparatus for producing cement clinker are known in the art. Fresh raw material or a fresh raw material mixture of powdered and fine-grained raw material components conventionally is preheated in a multi-stage suspension preheater, generally in a cyclone preheater. In this case the procedure is generally such that either the entire raw material passes through the preheater from top to bottom in general counterflow to hot kiln exhaust gases and is thereby preheated, whereupon this preheated material is then largely deacidified in a precalcination arrangement, or a proportion of the raw material which has been partially or thoroughly preheated is branched off in a lower cyclone stage, calcined in a separate precalcination arrangement with fuel and air for combustion delivered and is then introduced with the rest of the preheated raw material into the inlet of a kiln (generally a rotary kiln) in the first section of which the preheated and precalcined material is first of all subjected to final calcining and then burnt to clinker. The hot clinker leaving the kiln is then cooled in a cooler by means of cooling air. The exhaust gases leaving the preheater from its uppermost stage can then after suitable cooling be freed of entrained fine dust in a filter arrangement, and this cooling of the exhaust gases can generally take place in a special cooling tower and/or in a raw material grinding installation (raw mill).

In many known constructions, and particularly in cases where a relatively large proportion of powdered raw material is fed to the preheater, problems always occur because a relatively large proportion of fine dust is precipitated in the filter arrangement during extraction of dust from the exhaust gases from the preheater. Efforts have indeed been made to return this fine dust to the raw material mixture, and this can be done for example in the raw material grinding installation or by delivering this fine dust from the filter directly to a preheater stage. Practice has shown, however, that this fine dust and the rest of the cement raw material can only be mixed with relative difficulty, so that a type of dust circulation frequently builds up in the region at least between the uppermost preheater stage and the filter arrangement, which is undesirable because on the one hand the filter arrangement is too severely loaded and on the other hand adulteration of the material composition occurs in the finished cement clinker.

The object of the invention, therefore, is to provide an improved method and apparatus in which fine dust filtered out of the exhaust gases from the preheater can likewise be very reliably preheated, precalcined and introduced into the kiln whilst at the same time the filter arrangement can be relieved at least largely of fine dust circulation.

SUMMARY OF THE INVENTION

In the method according to the invention the procedure is such that the division of the partially preheated raw material is already undertaken at the material outlet of one of the uppermost preheater stages and in that case the greatest material fraction as first part-quantity is conveyed for the purpose of further preheating to the subsequent preheater stages, whilst the smaller material fraction as second part-quantity and all of the fine dust from the filter arrangement are fed jointly to the precalcination arrangement, pass through this precalcination arrangement from top to bottom, are guided in co-current with the air for combustion and with fuel being delivered are thereby precalcined.

This precalcined material is then introduced into the inlet of the kiln, whilst the hot exhaust gases from the precalcination arrangement are brought together with the exhaust gases from the kiln, i.e. these exhaust gases which have been brought together proceed jointly into the lowest stage of the suspension preheater, in which they ensure optimum preheating and partial calcination or deacidification of the raw material which is further preheated in the preheater.

Thus according to the invention all of the fine dust from the filter arrangement is introduced directly into the upper end of the precalcination arrangement, into which there is also simultaneously introduced the branched-off smaller material fraction of the raw material, already partially preheated, from one of the uppermost preheater stages. The co-current guiding of these materials together with the air for combustion likewise introduced at this upper end of the precalcination arrangement then ensures—with corresponding delivery of the necessary proportion of fuel—a reliable and optimum precalcination both of the second part-quantity of material which has already been partially preheated and also of the fine dust from the filter on the way from top to bottom through the precalcination arrangement. In this precalcination at least the majority of the total material is agglomerated or granulated, so that the fine dust which is delivered is largely or completely bound to the other material (the second part-quantity). In this way at least up to 100% of the precalcined material coming from the precalcination arrangement can then also be introduced into the inlet or into the inlet end of the kiln. If in fact a very small dust fraction of this precalcined material is entrained with the exhaust gases from the precalcination arrangement which are flowing into the preheater, then this can largely be precipitated again in the lowest preheater stage—together with the rest of the material preheated therein—and delivered to the kiln inlet.

According to the invention it is preferred if the second part-quantity divided off from the total quantity of the raw material which has been partially preheated in the preheater is set in a range from approximately 10% to approximately 30%. The setting of the exact percentage is dependent upon various factors, namely in particular upon the composition of the raw material from the various raw material components, also the quantity of fine dust from the filter (in which case, however, all of the fine dust from the filter is fed into the precalcination arrangement), and upon the achieved or desired degree of calcination at the kiln inlet and also upon the nature and quality of the fuel delivered to the precalcination arrangement, which may be any conventional fuel, i.e. any solid, liquid or gaseous fuel, but also—at least in part—waste-derived fuels (such as e.g. scrap tyres, refuse, waste coal and the like).

A multi-stage cyclone preheater is preferably or generally used a as suspension preheater. In this case the division of the partially preheated raw material (total raw meal mixture) is carried out below the material outlet of the uppermost cyclone preheater stage.

According to the invention the procedure is also such that both the partially preheated second part-quantity of material and the fine dust from the filter and also the air for combustion and the fuel are fed in at the upper end of the precalcination arrangement.

Although generally any suitable type of air for combustion, particularly preheated air for combustion, can be introduced into the upper end of the precalcination arrangement, according to an advantageous embodiment of the invention exhaust air from the cooler which is preheated to approximately 700 to 900° C., preferably to approximately 800 to 850° C., is delivered to the precalcination arrangement as air for combustion in the form of tertiary air. The optimum temperature of this tertiary air can essentially be achieved by extracting the exhaust air from a correspondingly hot region of the cooler.

As has already been indicated above, according to the invention at least a part of the fuel in the precalcination arrangement can be delivered in the form of waste-derived fuel, and the total fuel can be delivered in a plurality of part-quantities.

It is also regarded as advantageous if at least the fine dust from the filter and the fuel are introduced into the precalcination arrangement by way of separate gate arrangements, e.g. rotary vane gates. Naturally, the second part-quantity of the raw material partially preheated in the preheater can also be delivered in a similar manner to the precalcination arrangement. It may also be mentioned in this connection that the quantity of tertiary air to be introduced into the precalcination arrangement from the cooler can be regulated by corresponding adjusting flaps or the like.

According to the invention it is also regarded as advantageous if the calcination temperature for the preheated and precalcined material at the inlet or in the inlet end of the kiln is limited to a maximum of approximately 850 to 900° C.

This measure should above all ensure that the remaining calcination or deacidification of the preheated and precalcined material is carried out in the first section of the kiln which is preferably constructed as a rotary kiln. Since the transition from the final calcining to the beginning of the sintering (clinkering) generally takes place very rapidly, the aforementioned measure reliably prevents the kiln inlet and possibly lower pipe parts or lower sections of the preheater from becoming blocked by correspondingly overheated material fractions.

THE DRAWING

The invention will be explained in greater detail below with reference to apparatus for producing cement clinker which is illustrated in the drawing. The single drawing FIGURE is a schematic diagram of the apparatus.

DETAILED DESCRIPTION

The disclosed apparatus includes a multi-stage suspension preheater in the form of a cyclone preheater 1 with four cyclone stages disposed substantially above one another, namely a lowest cyclone stage 1a, a second lowest cyclone stage 1b, a third lowest cyclone stage 1c and an uppermost cyclone stage 1d. All preheater or cyclone stages 1a to 1d are connected to one another largely in the usual way by gas and material pipes in such a way that total raw material or the total raw material mixture delivered to the uppermost cyclone stage 1d according to the arrow 2 can be sufficiently preheated in the general counterflow between the raw material (solid arrows) and rising kiln exhaust gases (broken arrows).

A kiln is disposed downstream of the cyclone preheater 1 with respect to the material flow (solid arrows), and this kiln is preferably—as illustrated—a rotary kiln 3 constructed and operated in the usual way. A part of the raw material is—as will be explained in greater detail—delivered to a separate precalcination arrangement 4 in which it is precalcined with air for combustion and fuel being delivered, and then with the rest of the raw material preheated and partially calcined in the cyclone preheater 1 it is delivered to the inlet or inlet end 3a of the rotary kiln 3. In the region of this inlet end 3a the preheated and precalcined material is then first of all subjected to final calcining and then burnt to cement clinker. The hot cement clinker falls out of the rotary kiln 3 at the outlet end 3b and proceeds into a suitable cooler or clinker cooler 5 in which—as indicated by broken arrows—it is cooled by means of cooling air.

The exhaust gases leaving the preheater I from the uppermost cyclone stage 1d proceed by way of an exhaust gas pipe 6 and optionally a fan 7 after adequate cooling into a filter arrangement which is preferably formed by an electrostatic filter 8. Any cooling of the exhaust gases from the preheater which may be necessary can be carried out in a manner which is known per se and therefore not shown in a separate cooling tower and/or a raw material grinding plant. The fine dust (from the cement raw material) carried along by the exhaust gases from the preheater is precipitated in this electrostatic filter 8.

A distribution arrangement 9 with two branch connections 9a and 9b is associated with one of the uppermost preheater stages, particularly the uppermost preheater or cyclone stage 1d, at its lower material outlet 1d'. One branch connection 9a is connected by way of a first material branch pipe 10 to the gas pipe 11 leading from the second-lowest cyclone stage 1b to the third-lowest cyclone stage 1c (and thus to the succeeding lower cyclone stages 1c, 1b and 1a), whilst the other branch connection 9b is connected by way of a second material branch pipe 12 to the upper end (inlet end) 4a of the precalcination arrangement 4. The distribution arrangement 9 is disposed and constructed or adjustable so that by way of the first material branch pipe 10 the largest part-quantity of the partially preheated raw material can be led to the succeeding lower preheater cyclone stages, whilst by way of the second material branch pipe 12 a smaller part-quantity is introduced into the upper end 4a of the precalcination arrangement 4, and this smaller part-quantity in the second material branch pipe 12 can be set in the range from approximately 10% to approximately 30%, as has already been explained above.

It is also significant that a dust pipe 13 with a rotary vane gate 14 installed is likewise connected to the upper end 4a of the precalcination arrangement 4 in order to introduce all the fine dust from the electrostatic filter 8 into the precalcination arrangement 4 from above, and to do so jointly or parallel to the second material branch pipe 12 for the smaller part-quantity of material from the uppermost preheater cyclone stage 1d.

A tertiary air pipe 15 coming from the cooler 5 as well as at least one fuel supply pipe, preferably at least two such fuel supply pipes 16a, 16b, are also connected to this upper end 4a of the precalcination arrangement, a regulating valve 15a can advantageously be disposed in the tertiary air pipe 15 and suitable proportioning or gate arrangements, for example rotary vane gates 17 in the case of free-flowing fuel, can be disposed in the fuel supply lines 16a, 16b. In this way preheated air for combustion in the form of tertiary air can be delivered into the upper end 4a of the precalcination arrangement 4 by way of the tertiary air pipe 15, and the possibility also exists of delivering one type of fuel or a plurality of different types of fuel, at least some of which for example are waste-derived fuels, in a suitable manner and quantity.

As can be seen in the drawing, the lower end or outlet end 4b of the precalcination arrangement 4 is connected by way of a pipe 18 for the mixture of precalcined material and exhaust gases to the inlet end 3a of the rotary kiln 3 or an inlet housing 3c disposed before the inlet end 3a, with which the outlet 1a' of the lowest preheater cyclone stage 1a is also in communication.

The precalcination arrangement 4 can generally be constructed in any suitable manner by which it is ensured that during precalcination this precalcination arrangement 4 can be operated with the part-quantity of material, the fine dust from the filter and the air for combustion (tertiary air) in co-current in the case of a flow directed from top to bottom (according to the continuous and broken arrows). Particularly suitable for this is a precalcination arrangement 4 which contains a substantially upright calcination shaft 19, the interior of which has at least one necking or narrowing of its cross-section over the height of the shaft. In the embodiment illustrated in the drawing three such neckings 19a are shown at suitable distances from one another over the height. By means of the size, number and arrangement of these narrowings of the cross-section or neckings 19a of the shaft the flow of the material/gas suspension through the calcination shaft 19 and thus the degree of calcination which can be achieved in this calcination shaft can be influenced in a very advantageous manner. In fact, these neckings 19a of the shaft bring about turbulences which ensure an improved heat exchange between material and gas. It should also be noted that the hot combustion gases or the hot air for combustion, that is to say the tertiary air, is known to be relatively viscous, and therefore it is normally very difficult to mix with the delivered fine dust and also with the rest of the delivered material. Because of the turbulences caused in the calcination shaft 19 by the neckings 19a the mixing between this material (including fine dust) and the tertiary air can be markedly improved, thus also facilitating a uniform precalcination of the entire feed material. This calcination arrangement 4 can be disposed in a suitable and largely space-saving saving manner parallel to the preheater 1, and in this case the calcination shaft 19 can be of markedly smaller construction in terms of diameter and height than the preheater 1.

The mixture of precalcined material and calcination exhaust gases proceeds through the pipe 18 first of all into the inlet housing 3c of the rotary kiln 3 in which the precalcined material, which is at least largely agglomerated or granulated, is precipitated out of the calcination exhaust gases and proceeds into the actual rotary kiln inlet (inlet end 3a). The calcination exhaust gases which have been freed from this precalcined material are entrained by the kiln exhaust gases emerging from the inlet end 3a of the rotary kiln—as indicated by broken arrows—upwards into the kiln exhaust gas pipe 20 and introduced into the lowest cyclone stage 1a of the preheater 1, and the preheated material coming from the second-lowest cyclone stage 1b is also introduced into this kiln exhaust gas pipe 20, so that it is carried along by the rising exhaust gases into the lowest cyclone stage 1 and thereby exposed to an intensive heat exchange with the exhaust gases (from the precalcination arrangement 4 and the rotary kiln 3) which are still relatively hot. In order to prevent preheated material introduced into this kiln exhaust gas pipe 20 from falling through downwards into the inlet housing 3c a throttle point 20a can be constructed—as indicated in the drawing—at the lower end of the kiln exhaust gas pipe 20. In any case the material running through the preheater 1 overall from top to bottom will not only be particularly highly preheated but a certain proportion thereof will also be precalcined already. Depending upon the level of this degree of precalcination of the proportion of material passed through the preheater 1 or in adaptation to certain operating conditions, the material leaving the lower material outlet 1a' of the lowest preheater cyclone stage 1a can either be introduced directly by way of a material pipe 21 into the inlet end 3a of the rotary kiln 3 (together with the precalcined material from the pipe 18) or by way of another material pipe 22 connected to the pipe 18 it can first of all be brought together with the mixture of precalcined material and exhaust gases coming from the precalcination arrangement 4. In the latter case the material preheated in the preheater 1 can first of all be mixed with the mixture of calcination exhaust gases and precalcined material before the preheated and precalcined material is introduced—to some extent as a material mixture—into the inlet end 3a of the rotary kiln 1. In order to be able to have both pipe possibilities (with material pipes 21 and 22), a suitable diverter or adjusting flap 23 can also be disposed below the material outlet 1a' of the lowest cyclone stage 1a.

There is also the possibility of operating the preheater 1 at its lower end, i.e. particularly in the region of the kiln exhaust gas pipe 20, with a reducing atmosphere in order to reduce the NOx emission in the exhaust gas from the preheater. In this case fresh air can enter for example in the junction between the inlet end 3a of the rotary kiln and the inlet housing 3c.

From the description of the apparatus which is illustrated schematically in the drawing it can be seen that the method according to the invention which is described above can be carried out in a very advantageous manner in this apparatus. For the sake of completeness it should also be mentioned in this connection that the total proportion of fuel or fuels which is necessary for producing or burning cement clinker from cement raw material is distributed in the necessary manner to the burner 3d of the rotary kiln 3 and to the fuel supply (fuel supply pipes 16a and 16b).

I claim:

1. In a method of producing cement clinker from powdered and fine-grained raw material wherein:

a) fresh raw material is preheated in a vertical multi-stage suspension preheater by rising kiln exhaust gases, b) the preheated material is separated into first and second part-quantities the first of which is branched off from an outlet of an upper stage of the preheater and precalcined in the presence of fuel and preheated combustion air in an upright precalcinator having an outlet, c) the preheated material from the preheater and the precalcined material from the precalcinator are subjected to final calcination in a kiln via a material kiln inlet and burnt to clinker, d) the clinker is cooled in a cooler, and e) dust in exhaust gases from the preheater is extracted in a filter, the improvement comprising:

f) delivering the second part-quantity of preheated raw material to lower stages of said preheater for further heating;

g) feeding the first part-quantity of preheated material and all of the dust jointly to the precalcinator for passage therethrough from top to bottom co-current with said combustion air and said fuel; and h) introducing the precalcined material into the kiln via said inlet together with exhaust gases from the precalcinator and the kiln.

2. The method according to claim 1 wherein the second part-quantity is between approximately 10% and 30% of the preheated material.

3. The method according to claim 1 wherein the suspension preheater includes an uppermost preheater cyclone stage and wherein the first part-quantity of preheated raw material is branched off at the uppermost preheater cyclone stage.

4. The method according to claim 1 including delivering the preheated second part-quantity of the material, the dust, the combustion air, and the fuel to the upper end of the precalcinator.

5. The method according to claim 4 including delivering exhaust air from the cooler to the precalcinator at a temperature of approximately 700° C. to 900° C. as tertiary combustion air.

6. The method according to claim 4 including delivering exhaust air from the cooler to the precalcinator at a temperature of approximately 800° C. to 850° C. as tertiary combustion air.

7. The method according to claim 4 wherein the fuel delivered to the precalcinator is partly waste-derived fuel and wherein the total fuel is delivered in a plurality of part-quantities.

8. The method according to claim 1 including introducing the dust and the fuel into the precalcinator separately.

9. The method according to claim 1 including combining the first part-quantity of material with a mixture of exhaust gases and calcined material in a region between the outlet of the precalcinator and the inlet of the kiln.

10. The method according to claim 1 including introducing the preheated and partially calcined first part-quantity of material directly into the inlet of the kiln.

11. The method according to claim 1 including limiting the calcination temperature at the inlet of the kiln to a maximum of approximately 850° C. to 900° C.

12. In apparatus for producing cement clinker from powdered and fine-grained raw material having:
   a) a vertical multi-stage cyclone preheater;
   b) a precalcinator for receiving a part-quantity of at least partially preheated raw material, combustion air, and fuel and connected to a distributor at a level below that of a preheater cyclone stage, said precalcinator having an outlet;
   c) a kiln having an inlet and in which preheated and precalcined material are burnt to cement clinker;
   d) a cooler downstream of the kiln for cooling the clinker; and
   e) a filter for precipitating dust from the cyclone preheater from exhaust gases,
   the improvement including:
   f) a first material branch pipe for delivering a relatively larger part-quantity of the preheated raw material from the distributor to a succeeding lower preheater cyclone stage;
   g) a second material branch pipe for delivering a relatively smaller part-quantity of partially preheated raw material to the calcinator;
   h) a dust pipe for delivering the dust from the filter to the precalcinator; and
   i) a combustion air delivery pipe for delivering combustion air to the precalcinator co-current with the dust and combustion air,
   j) said precalcinator outlet and the lowest preheater cyclone stage being in communication with the kiln inlet.

13. The apparatus according to claim 12 including at least one fuel supply connected to the precalcinator at its upper end.

14. The apparatus according to claim 13 wherein at least a portion of said fuel comprises waste-derived fuel.

15. The apparatus according to claim 12 or 13 including gate means in the dust pipe and in the fuel supply pipe.

16. The apparatus according to claim 15 wherein said gate means comprises a rotary vane gate.

17. The apparatus according to claim 12 wherein the combustion air delivery pipe is connected between the cooler and the precalcinator and conducts preheated air from the cooler to the precalcinator.

18. The apparatus according to claim 12 wherein the precalcinator has a substantially upright calcination shaft provided at its interior with at least one necking extending longitudinally of the shaft.

19. The apparatus according to claim 12 wherein the lowermost preheater cyclone has a material outlet connected to the lower end of the precalcinator and to the kiln inlet.

20. The apparatus according to claim 12 wherein the lowest preheater cyclone stage is connected directly to the kiln inlet.

21. The apparatus according to claim 12 wherein the filter comprises an electrostatic filter.

* * * * *

UNITED STATES PATENT AND TRADEMARK OFFICE
CERTIFICATE OF CORRECTION

PATENT NO. : 6,012,918
DATED : January 11, 2000
INVENTOR(S) : Joseph E. Doumet

It is certified that error appears in the above-identified patent and that said Letters Patent is hereby corrected as shown below:

Column 1, line 24, after "and" cancel -- is --.

Column 5, line 39, after "space-saving" cancel -- saving --(second occurence)

Claim 12, line 7, change "a" to -- an upper --; line 22, after "material" insert -- from the distributor--.

Signed and Sealed this

Twenty-sixth Day of December, 2000

Attest:

Q. TODD DICKINSON

Attesting Officer

Director of Patents and Trademarks